United States Patent
Hilton et al.

(10) Patent No.: US 10,661,968 B1
(45) Date of Patent: May 26, 2020

(54) CONTAINER SYSTEM FOR MIXING AND DISPENSING

(71) Applicant: ELC Management LLC, Melville, NY (US)

(72) Inventors: Jill Marie Hilton, Merrick, NY (US); Charles Aaron Curtiss, Norwalk, CT (US); Stephanie Astrid Lamb-Korsavidis, Farmingdale, NY (US); Agostinho Martins, New Hyde Park, NY (US)

(73) Assignee: ELC Management LLC, Melville, NY (US)

( * ) Notice: Subject to any disclaimer, the term of this patent is extended or adjusted under 35 U.S.C. 154(b) by 0 days.

(21) Appl. No.: 16/447,361

(22) Filed: Jun. 20, 2019

(51) Int. Cl.
  *B65D 25/08* (2006.01)
  *B65D 81/32* (2006.01)
  *A45D 40/24* (2006.01)

(52) U.S. Cl.
  CPC .......... *B65D 81/3211* (2013.01); *A45D 40/24* (2013.01); *A45D 2200/25* (2013.01)

(58) Field of Classification Search
  CPC   B65D 51/2835; B65D 81/3211; A45D 40/24; A45D 2200/25; A61J 1/2089
  USPC .......................................... 206/219–222, 568
  See application file for complete search history.

(56) References Cited

U.S. PATENT DOCUMENTS

| | | | | |
|---|---|---|---|---|
| 4,614,437 A | * | 9/1986 | Buehler ................ | B01F 13/002 141/319 |
| 6,237,649 B1 | * | 5/2001 | Moisio ............... | B65D 81/3211 141/100 |
| 6,533,113 B2 | * | 3/2003 | Moscovitz ......... | B65D 51/2835 206/222 |
| 7,308,915 B2 | * | 12/2007 | Johns ................. | B65D 81/3211 141/100 |
| 8,087,842 B2 | | 1/2012 | Bouix | |
| 2002/0066677 A1 | * | 6/2002 | Moscovitz ......... | B65D 51/2835 206/219 |
| 2003/0030278 A1 | * | 2/2003 | Shimei .................. | A61J 1/2089 285/331 |
| 2007/0039975 A1 | * | 2/2007 | Bochtler .............. | B65D 71/502 222/142.5 |
| 2011/0042944 A1 | * | 2/2011 | Johns .................... | A61J 1/2089 285/330 |
| 2014/0361016 A1 | * | 12/2014 | Moreau .............. | B65D 51/2835 220/502 |
| 2015/0027913 A1 | * | 1/2015 | P. J. .................... | B65D 81/3211 206/222 |

* cited by examiner

*Primary Examiner* — Luan K Bui
(74) *Attorney, Agent, or Firm* — Peter Giancana

(57) ABSTRACT

A container system for mixing and dispensing that comprises two containers, each container holding one or more ingredients. A first container is sealed with a frangible seal. A second container is sealed with a reusable cap and closure. At the time of use, the containers are able to be joined in a way that creates a passageway from one container to the other, which allows the ingredients in each container to mix. When the containers are separated, the first container is empty, and the second container holds the mixed ingredients. The second container can be fitted with the reusable cap closure to seal off the mixed ingredients from the ambient environment.

12 Claims, 4 Drawing Sheets

CONTAINER SYSTEM FOR MIXING AND DISPENSING

FIELD OF THE INVENTION

The invention is in the field of packaging for consumer products, such as found in the cosmetic and personal care industry. More specifically, the invention pertains to packaging that is able to keep multiple ingredients and/or compositions separated until they are mixed at the time of use.

BACKGROUND

In the cosmetic and personal care industry, packaging that is able to keep multiple ingredients and/or compositions separated are known. These include systems that comprise separate compartments for different ingredients and/or compositions, wherein a first compartment must be pierced in order to release its ingredients into a second compartment. For example, U.S. Pat. No. 8,087,842 discloses a multi-compartment, wiper-applicator package that comprises a container holding a first formulation, a wiper that is initially sealed at both ends, and a barbed tool. Within the sealed wiper is a quantity of secondary ingredients that is to be mixed with the first formulation in the container. The barbed tool is able to pierce the top seal, and then dislocate the bottom seal to allow the secondary ingredients to fall into the first formulation for mixing therewith. In this case, a much smaller, secondary compartment of ingredients is stored inside of a much larger primary compartment. This limits the size of the secondary compartment, and places restrictions on the shape and size of the primary compartment. Also, once the barbed tool is used to breach the two seals, it has no further use. Also, the appearance of the primary compartment may be adversely affected by the need to accommodate the secondary compartment within itself.

OBJECT OF THE INVENTION

To provide a dual container system that is able to prevent multiple ingredients and/or compositions from mixing until a time of use.

To provide a container system that comprises separate primary and secondary containers that can be joined for the purpose of mixing ingredients, and that can be separated thereafter.

SUMMARY

A system mixing and dispensing two products that comprises two containers. The first container is sealed with a frangible seal. The second container is sealed with a reusable cap. At the time of use, the containers are able to be joined in a way that creates a passageway from one container to the other, which allows the ingredients in each container to mix. When the containers are separated, the first container is empty, and the second container holds the mixed ingredients. The second container can be fitted with the reusable cap to seal off the mixed ingredients from the ambient environment.

DETAILED DESCRIPTION

A container system according to the present invention, for mixing two products and dispensing the mixed products, comprises a first container (1) that cooperates with a first closure (2), and a second container (11) that cooperates with a second closure (12). In the figures, the containers are shown as cylindrical and essentially identical, but the invention is not limited by the shapes of the first and second containers. The two products should be flowable, both before and after mixing. Either product may be a readily flowable liquid or flowable granulated solid (such as a powder). It is not a requirement that the products possess any degree of mutual solubility, however, it is preferably if one product is at least partially soluble in the other, and more preferable if the two products can achieve complete miscibility with simple shaking First Container (1) and First Closure (2)

Figure 1A:
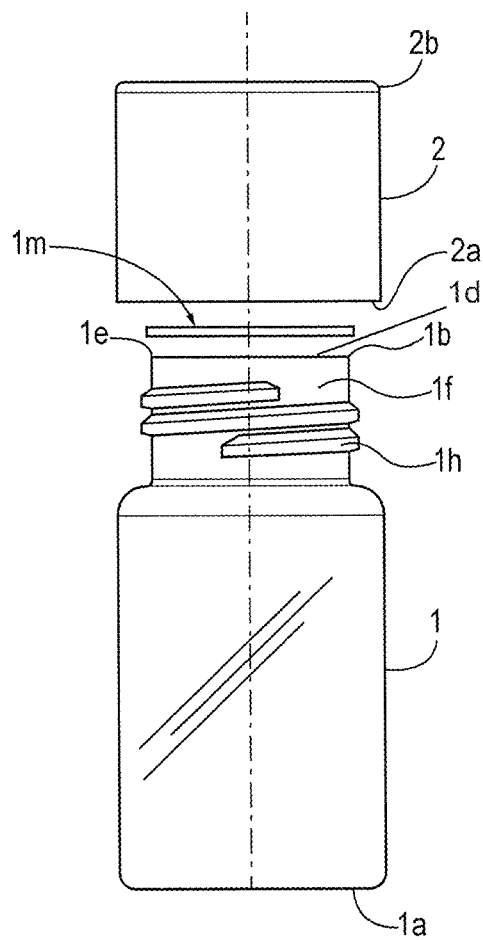
FIGS. 1A and 1B depict a first container with a first custom closure for containing a first product.
Figure 1B:
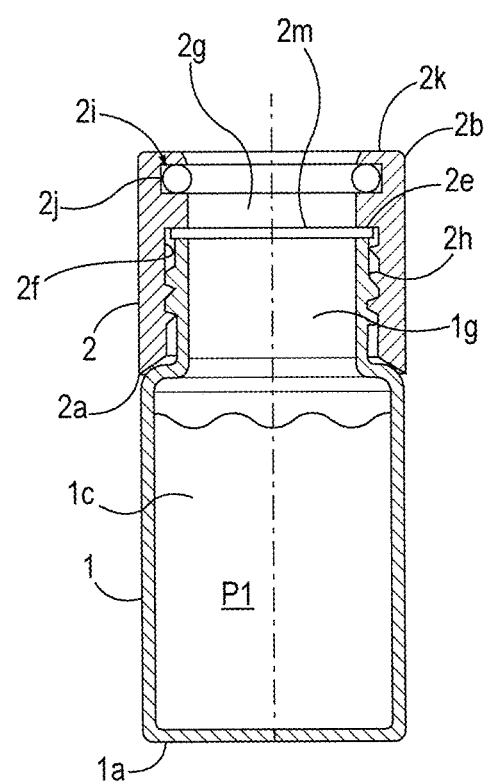

Referring to FIGS. 1A and 1B, the first container (1) comprises a closed bottom (1a) and an opened top (1b). Between the closed bottom and opened top of the first container is a first reservoir (1c) that is able to contain a quantity of first product (P1). The opened top of the first container comprises an orifice (1d) that gives access to the first reservoir, and a sealing surface (1e) that surrounds the orifice (1d). The opened top of the first container may be formed as a neck portion (1f) onto which a closure can be mounted. The neck portion defines a passageway (1g) between the orifice (1d) and the first reservoir (1c).

A first closure (2) is designed to be mounted to the top of the first container (1), to seal off the orifice (1d) of the first container. The first closure has an opened bottom (2a) and an opened top (2b). Means for removably securing the first closure to the first container are provided. For example, screw threads (1h) may be provided near the top (1b) of the first container (for example, on the neck portion (1f)) which will cooperate with screw threads (2h) of the first closure. The screw threads of the first closure (2) are located on an interior surface (2f) of a lower portion of the first closure. Above this lower portion of the first closure is a sealing surface (2e). When the first closure is mounted to the first container, then the sealing surface (2e) of the first closure bears down against the sealing surface (1e) of the first container. The first closure extends a distance above the sealing surface (2e), which defines a passageway (2g) that passes completely through the first closure between the opened bottom (2a) and opened top (2b) of the first closure. However, when the first closure is mounted on the first container (1), then passageway (2g) merges with passageway (1g) of the neck (1f) of the first container.

In order to seal off the orifice (1d) of the first container (1), and protect the first product (P1) in the first reservoir (1c), one or more frangible membranes are provided between the sealing surface (1e) of the first container (1) and the sealing surface (2e) of the first closure (2). For example, a frangible membrane (1m) may be glued, welded, in-molded or otherwise securely affixed to the sealing surface (1e) of the first container. Alternatively, a frangible membrane (2m) may be glued, welded, in-molded or otherwise securely affixed to the sealing surface (2e) of the first closure. Alternatively, both the first container and first closure may be provided with a frangible membrane (1m and 2m). Suitable membranes may be fashioned out of plastic, foil, paper or a combination of these. To protect the first product (P1), the membrane(s) should limit the transmission of gasses and water vapor in either direction, to a level that will not adversely affect the stability and function of the product.

In the passageway (2g) of the first closure (2), at a level above the sealing surface (2e), a sealing ring, such as an O-ring (2i) is fixed. The O-ring may be fixed in place by friction, adhesive, welding or the like. Optionally, as seen in the drawings, a groove (2j) may be provided on the interior surface of the first closure. The O-ring is received into the groove, but a portion of the O-ring protrudes into the passageway (2g) of the first closure. Optionally, the opened top (2b) of the first closure (2) is formed with a flat surface (2k). The purpose of these features will be made clear below.

Second Container (11) and Second Closure (12)

Figure 2A:
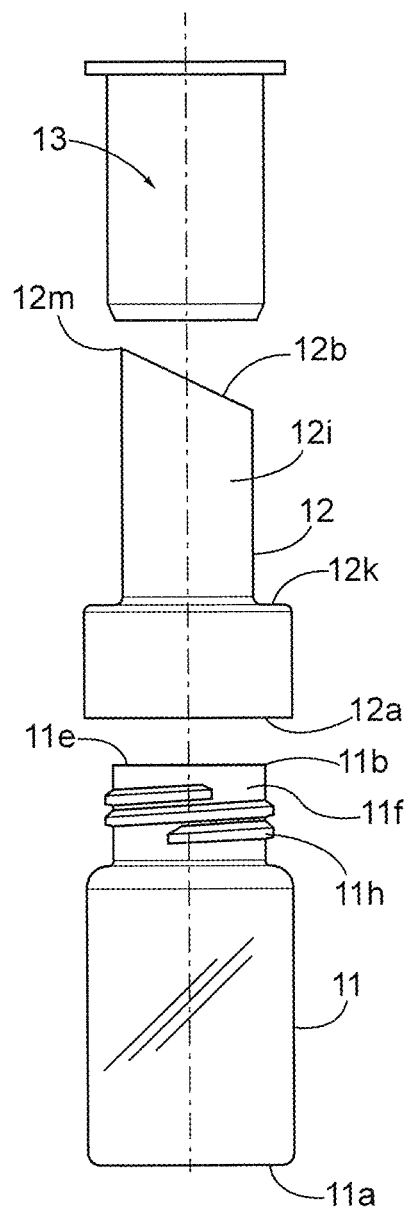
FIGS. 2A and 2B depict a second container with a second custom closure for containing a second product.
Figure 2B:
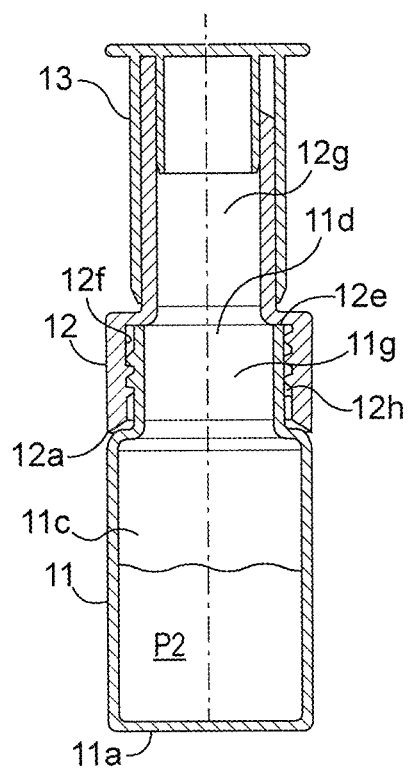

Referring to FIGS. 2A and 2B, the second container (11) comprises a closed bottom (11a) and an opened top (11b). Between the closed bottom and opened top of the second container is a second reservoir (11c) that is able to contain a quantity of second product (P2). The opened top of the second container comprises an orifice (11d) that gives access to the second reservoir, and a sealing surface (11e) that surrounds the orifice (11d). The opened top of the second container may be formed as a neck portion (11f) onto which a closure can be mounted. The neck portion defines a passageway (11g) between the orifice (11d) and the second reservoir (11c).

A second closure (12) is designed to be removably secured to the top of the second container (11). The second closure has an opened bottom (12a) and an opened top (12b). Means for securing the second closure to the second container are provided. For example, screw threads (11h) may be provided near the top (11b) of the second container (for example, on the neck portion (11f)) which will cooperate with screw threads (12h) of the second closure. The screw threads of the second closure are located on an interior surface (12f) of a lower portion of the second closure. Above this lower portion of the second closure is a sealing surface (12e). When the second closure is mounted to the second container, then the sealing surface (12e) of the second closure bears down against the sealing surface (11e) of the second container. The opened top end (12b) of the second closure is formed as an extended spout (12i) that extends a distance above the sealing surface (12e). The base of the spout may be provided with a flat surface (12k). A passageway (12g) passes completely through the second closure between the opened top and opened bottom of the second closure. However, when the second closure is mounted on the second container (11), then passageway (12g) merges with passageway (11g) of the neck (11f) of the second container.

In order to protect the second product (P2) in the second reservoir (11c), a cap (13) is provided. The cap is designed to seal off the opened top (12b) of the second closure (12). For example, the cap may have the same cross sectional shape as the spout (12i) (circular, for example) and be sized for an interference fit on the spout. Alternatively, the spout and cap could have cooperating features, like screw threads, bayonet fittings or other snap fittings.

Use of the System

Figure 3A:
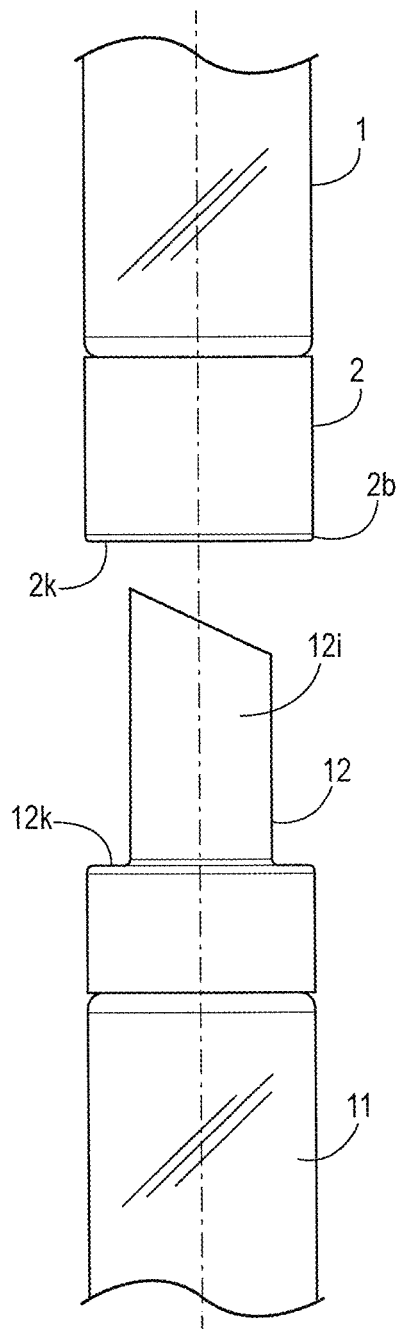
FIGS. 3A and 3B depict the interaction of the first container-closure with the second container-closure to mix the first and second product.
Figure 3B:
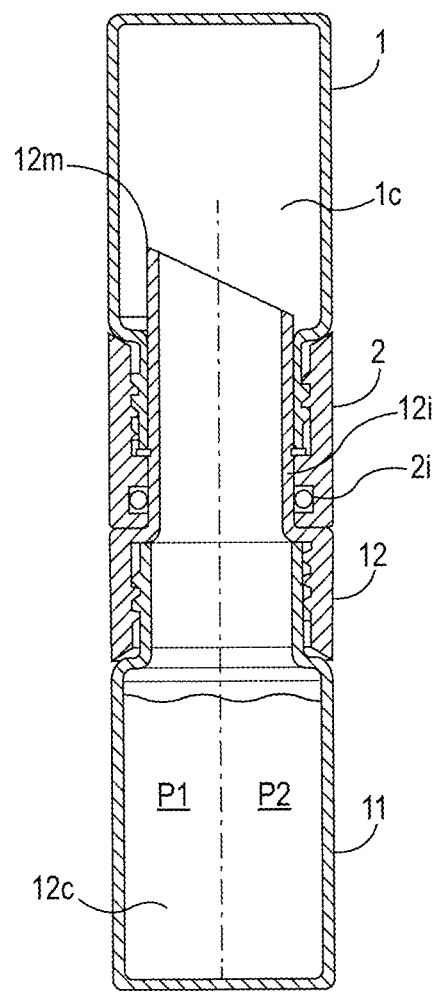

Referring to FIGS. 3A and 3B, with the cap (13) removed from the spout (12i) of the second closure (12), the spout is able to be inserted into the opened top (2b) of the first closure (2). This should be achieved by inverting the first container (1) and allowing the spout to enter the opened top (2b) of the first closure. As the spout of the second closure is inserted into the opened top of the first closure, the spout comes to bear against the one or more frangible membranes (1m and/or 2m), piercing the membranes, and establish flow communication between the first (1c) and second (11c) reservoirs. To facilitate piercing the membranes, the spout may be formed with a leading edge (12m). The spout is sized for an interference fit with the O-ring (2i) of the first closure. The position of the O-ring near the opened top (2b) of the first closure (2) means that a seal is formed around the spout, before the membranes are pierced. As a result, the system avoids inadvertent leakage from around the puncture site, especially if the user is hesitant in completing the piercing or insertion action. This arrangement also prevents leaks when the joined containers are held in a horizontal or angled position. Once the one or more membranes are pierced, the spout may be further inserted into the second closure, until the flat surface (12k) of the second closure bears against the flat surface (2k) of the first closure.

At this point, the contents of the first container (1) can fall or drain into the second container (11). Because of the effective seal between the O-ring (2i) and the spout (12i), the joined containers can be shaken to mix the first (P1) and second (P2) products, without fear of spilling any product. The abutting of flat surfaces (2k) and (12k) adds a stability to the joined configuration. Optionally, those flat surfaces can be provided with means for temporarily locking the two surface together. Fastening means may include the use of keyhole slots or bayonet-style fittings. This option would further reduce movement between the first and second closures during transfer of contents and shaking.

Once all of first product (P1) has been transferred into the second container (11), the containers may be separated, preferably with the second container in an upright position as shown in FIG. 3B. As the spout (12i) is withdrawn through the O-ring (2i), the O-ring wipes the spout clean. At this point, the cap (13) may be replaced on the cleaned spout (12i) to allow further shaking and/or storage, without any mess. Otherwise, the mixed products are ready for being dispensed from the second reservoir (12c) through the spout (12i).

The first and second containers (1, 11) do not have to be the same size, and may be provided in an unlimited number capacities. However, the second container does need to be big enough to accommodate both quantities of products (P1, P2), preferably with some headspace left over to allow efficient mixing. With that restriction, typical volumes of the first and second reservoirs (1c, 11c) may range from about 15 mL to about 500 mL.

Figure 4:
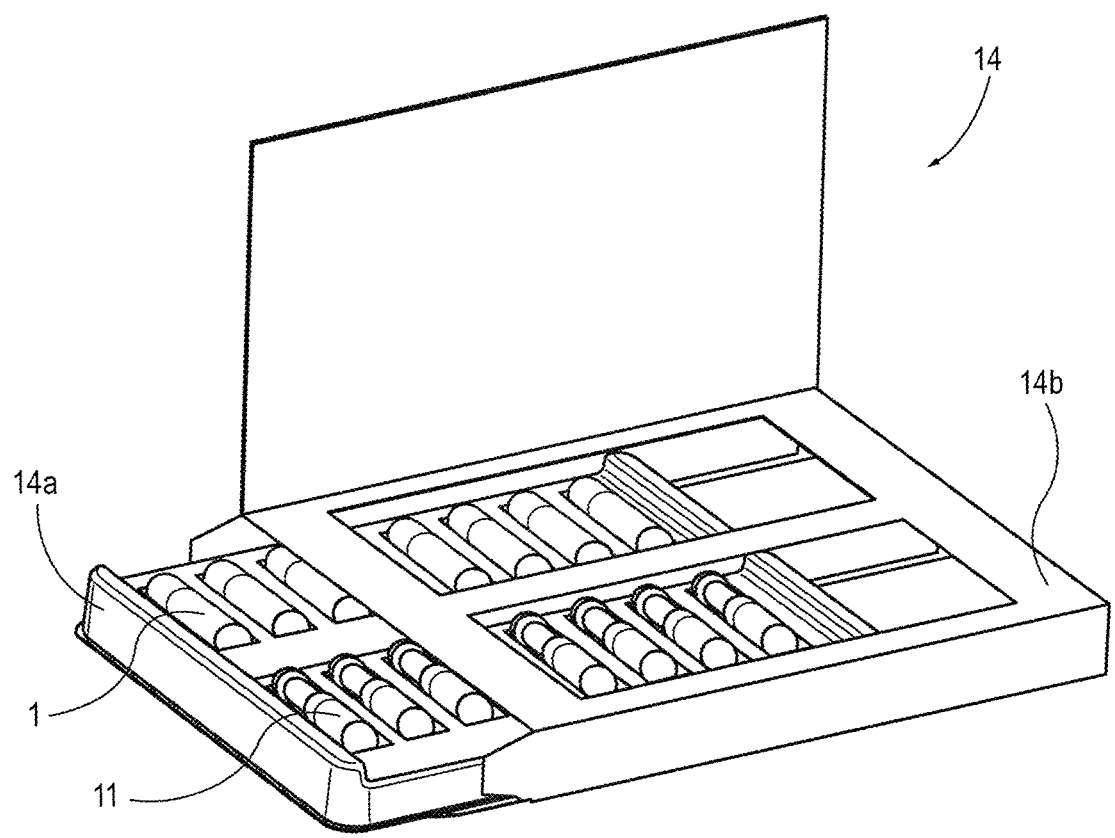
FIG. 4 represents one embodiment of a kit of single dose packages intended as a one week supply.

Although the first and second containers may be provided in an unlimited number capacities, the simplicity of the present design makes the container system, described herein, ideal for use as single-dose packaging, especially for providing a kit of multiple single-dose container systems, where two or more products or ingredients should remain separated until the time of use. By single dose, we mean that the combined quantity of the flowable products (P1 and P2) is sufficient for exactly one dose on intended use, and thereafter, the container system should be discarded. For example, a kit may comprise one or more plastic trays that houses an equal number of first (1) and second (11) containers, as described herein. Furthermore, the tray may be packaged in an outer carton for retail distribution. FIG. 4 represents one embodiment of a kit (14) of single dose container systems intended as a one week supply. The kit comprises a single tray (14a) that holds seven first containers (1) and seven second containers (11). The tray is packaged in an outer carton (14*b*). In this case, the intended use is once per day, for one week. However, the number of first and second containers may be any number desired. Seven for a once-a-day one week supply, 30 for a once-a-day one month supply, and 14 for a twice-a-day one week supply are non-limiting examples.

What we claims is:

1. A container system for mixing two flowable products and dispensing the mixed products comprising:
   a first container (1) that comprises:
   a first reservoir (1*c*) that is able to contain a quantity of first flowable product (P1);
   an opened top (1*b*) that comprises an orifice (1*d*) that gives access to the first reservoir (1*c*);
   a sealing surface (1*e*) that surrounds the orifice (1*d*); and
   a frangible membrane (1*m*) affixed to the sealing surface (1*e*) to seal off the orifice (1*d*);
   a first closure (2) that is able to be removably secured to the first container (1), having:
   an opened top (2*b*); and
   a sealing surface (2*e*) located inside the first closure (2), such that when the first closure (2) is mounted to the first container (1), then the sealing surface (2*e*) of the first closure bears down against the sealing surface (1*e*) of the first container;
   a second container (11) that comprises:
   a second reservoir (11*c*) that is able to contain a quantity of second flowable product (P2);
   an opened top (11*b*) that comprises an orifice (11*d*) that gives access to the second reservoir (11*c*);
   a sealing surface (11*e*) that surrounds the orifice (11*d*); and
   a second closure (12) that is able to be removably secured to the second container (11), having:
   an opened top (12*b*) that is formed as a extended spout (12*i*); and
   a sealing surface (12*e*) located inside the second closure (12),
   such that when the second closure (12) is mounted to the second container (11), then the sealing surface (12*e*) of the second closure bears down against the sealing surface (11*e*) of the second container; and
   wherein, the spout (12*i*) is able to be inserted into the opened top (2*b*) of the first closure (2), such that the spout will pierce the frangible membrane (1*m*) to establish flow communication between the first reservoir (1*c*) and second reservoir (11*c*); and
   wherein the first closure (2) further comprises a sealing ring (2*i*) that is fixed in a groove (2*j*) inside the first closure, above the level of the sealing surface (2*e*), and
   wherein the spout (12*i*) of the second closure (12) is sized for an interference fit within the sealing ring (2*i*), such that the sealing ring forms a seal around the spout when the spout is inserted into the opened top (2*b*) of the first closure (2).

2. The container system of claim 1 wherein the opened top (2*b*) of the first closure (2) is formed with a flat surface (2*k*), and the base of the spout (12*i*) is provided with a flat surface (12*k*), such that the spout may be inserted into the first closure until the flat surface of the second closure bears against the flat surface of the first closure.

3. The container system of claim 1 wherein the spout (12*i*) is formed with a leading edge (12*m*) to facilitate piercing the membrane (1*m*).

4. The container system of claim 1 further comprising a cap (13) that is able to seal off the opened top (12*b*) of the second closure (12).

5. The container system of claim 1 wherein one of the two flowable products is at least partially soluble in the other.

6. The container system of claim 5 wherein the two flowable products can achieve complete miscibility with simple shaking.

7. The container system of claim 1 wherein at least one of the two flowable products is a granulated solid.

8. The container system of claim 1 wherein the second container (12) is able to accommodate both quantities of products (P1, P2).

9. The container system of claim 1 wherein the combined quantity of the flowable products (P1, P2) is sufficient for exactly one dose.

10. The container system of claim 1 wherein the first closure further comprises a frangible membrane (2*m*) affixed to the sealing surface (2*e*) to seal off the orifice (1*d*).

11. A kit that comprises multiple container systems according to claim 9.

12. A kit according to claim 11 wherein the number of container systems is at least seven.

* * * * *